(12) United States Patent
Brown

(10) Patent No.: US 8,979,465 B2
(45) Date of Patent: Mar. 17, 2015

(54) APPARATUS FOR SAFETY BARREL PLACEMENT AND REMOVAL

(76) Inventor: Jeffrey C. Brown, Bothell, WA (US)

( * ) Notice: Subject to any disclaimer, the term of this patent is extended or adjusted under 35 U.S.C. 154(b) by 570 days.

(21) Appl. No.: 12/778,935

(22) Filed: May 12, 2010

(65) Prior Publication Data

US 2010/0290880 A1 Nov. 18, 2010

Related U.S. Application Data

(60) Provisional application No. 61/177,390, filed on May 12, 2009.

(51) Int. Cl.
*B60P 1/00* (2006.01)
*B66F 9/065* (2006.01)
*B60P 1/52* (2006.01)

(52) U.S. Cl.
CPC .. *B66F 9/065* (2013.01); *B60P 1/52* (2013.01)
USPC ........................................................ 414/518

(58) Field of Classification Search
USPC ......... 414/399, 466, 495, 497–499, 501, 502, 414/507, 509, 510, 518, 522, 523, 529, 531, 414/532, 528, 527, 535, 541, 544, 551, 489, 414/505, 525.9; 193/35 R
See application file for complete search history.

(56) References Cited

U.S. PATENT DOCUMENTS

| | | | | |
|---|---|---|---|---|
| 1,042,336 A * | 10/1912 | Francis et al. | ............... | 414/535 |
| 2,099,998 A * | 11/1937 | Berg | ............... | 414/546 |
| 2,707,573 A * | 5/1955 | Balwics | ............... | 414/608 |
| 3,142,396 A * | 7/1964 | Pauley et al. | ............... | 414/812 |
| 3,292,804 A * | 12/1966 | Veneman | ............... | 414/659 |
| 3,750,900 A * | 8/1973 | Piercey | ............... | 414/788.2 |
| 3,777,916 A * | 12/1973 | Lutz | ............... | 414/502 |
| 3,999,674 A * | 12/1976 | Meitl | ............... | 414/485 |
| 4,163,524 A * | 8/1979 | Lundahl et al. | ............... | 241/30 |
| 4,370,796 A * | 2/1983 | Wilson | ............... | 29/564.3 |
| 4,655,667 A * | 4/1987 | Plumb et al. | ............... | 414/343 |
| 4,832,553 A * | 5/1989 | Grey et al. | ............... | 414/789.7 |
| 5,244,334 A * | 9/1993 | Akita et al. | ............... | 414/502 |
| 6,435,369 B1 * | 8/2002 | Poursayadi | ............... | 221/185 |
| 6,726,434 B2 * | 4/2004 | Orthaus et al. | ............... | 414/539 |
| 7,101,143 B2 * | 9/2006 | Orthaus et al. | ............... | 414/788.2 |
| 2006/0054461 A1 * | 3/2006 | Jordan | ............... | 198/602 |

* cited by examiner

*Primary Examiner* — Saul Rodriguez
*Assistant Examiner* — Glenn Myers
(74) *Attorney, Agent, or Firm* — Lane Powell PC; Priya Sinha Cloutier

(57) ABSTRACT

The main object of the current invention is to provide an apparatus, that can be installed on a flat bed truck, pre-market or post-market, which allows barrels, to efficiently and safely, placed or removed from a road or other work site.

5 Claims, 4 Drawing Sheets

US 8,979,465 B2

APPARATUS FOR SAFETY BARREL PLACEMENT AND REMOVAL

CROSS-REFERENCES TO RELATED APPLICATIONS

This application claims priority to provisional application No. 61/177,390, filed on May 12, 2009, and incorporates that application, in its entirety, by reference.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND

In 2008, a U.S. Department of Labor report found that traffic fatalities are the top cause of worker deaths in work zones, accounting for at least a quarter of workplace deaths. The good news is that the number of traffic fatalities has decreased since highway construction crews started using safety orange barrels. The safety orange barrel has been successful in reducing deaths for two reasons.

First, the color, safety orange, alerts a driver. Safety orange is a hue that is a complementary contrast to the azure color of the sky. Second, the size of the safety orange barrel is more noticeable than the traditional traffic cone and provides some barrier between a vehicle and a worker.

Although the safety orange barrel increases worker safety, it is time consuming to place and remove the safety orange barrel from the site of construction. Generally, to place barrels in position, a vehicle moves along the site where the barrels are to be placed while one worker hands barrels down, from the vehicle, to a second worker walking along side the truck. The second worker places the barrels in position. This method is slow and requires at least 2 workers and a driver. A second method to place barrels requires a worker to drop barrels from the truck onto the site. Although this method only takes 1 driver and 1 worker, it can be ineffective. For example, if the barrels are not weighted, they may tip over when being dropped onto the location.

Retrieving the barrels from the road more difficult. Generally, a truck moves along the road from which the barrel must be collected and at least one worker walks alongside the truck lifting barrels onto the truck. In this scenario, the worker lifting barrels may place the barrels directly on the truck or hand the barrel to another worker on the truck. If the barrels are weighted, it may take more than one worker to lift the barrels onto the truck. In either one of these scenarios, at least one worker is fighting against gravity.

The methods discussed above for placing and removing barrels from a road makes for dangerous work conditions. The worker working on top of the truck can easily fall off. The worker walking along side the truck may be hit by oncoming traffic or may be injured by a misstep.

The main object of the current invention is to provide an apparatus, that can be installed on a flat bed truck, pre-market or post-market, which allows barrels to efficiently and safely placed or removed from a work site.

BRIEF SUMMARY OF THE INVENTION

The main object of the current invention is to provide an apparatus, that can be installed on a flat bed truck, pre-market or post-market, which allows barrels to efficiently and safely placed or removed from a work site.

BRIEF DESCRIPTION OF THE SEVERAL VIEWS OF THE DRAWINGS

Other features and advantages of the present invention will become apparent in the following detailed descriptions of the preferred embodiment with reference to the accompanying drawings, of which.

DETAILED DESCRIPTION OF THE INVENTION

Figure 1:
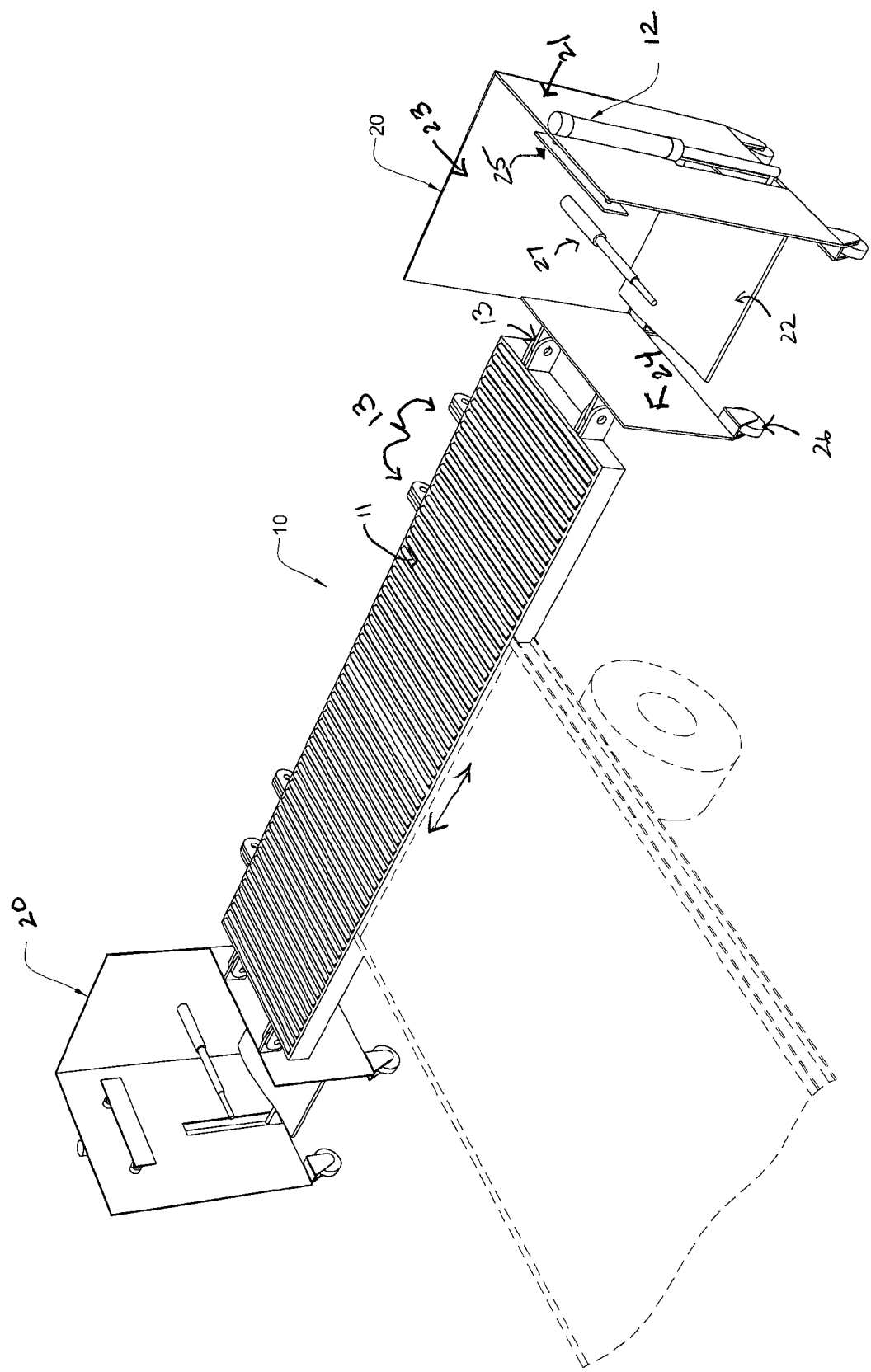
FIG. 1 is a front side elevational view of the invention attached to a truck.
Figure 2:
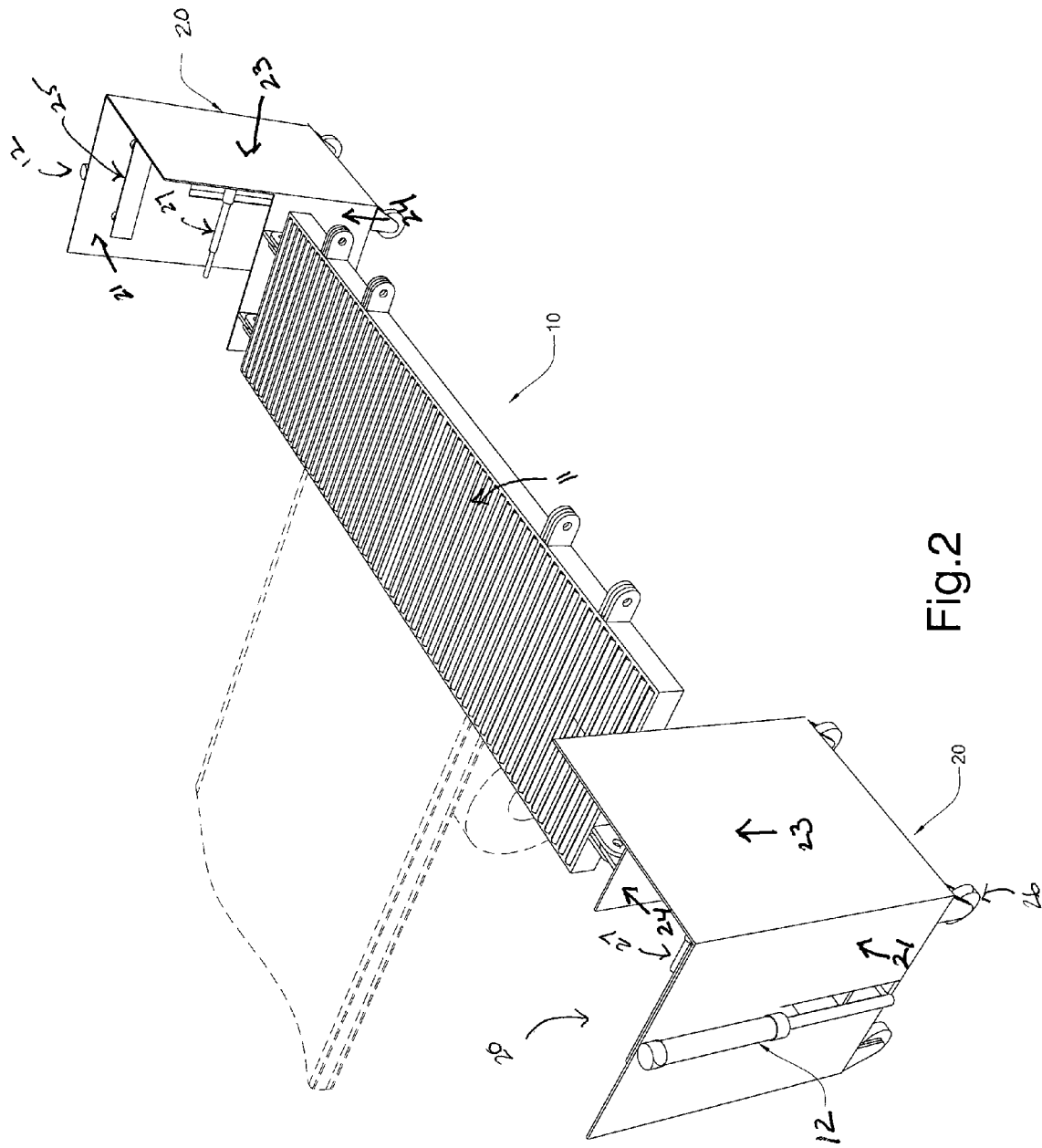
FIG. 2 is a back side elevational view of the invention attached to a truck.
Figure 3:
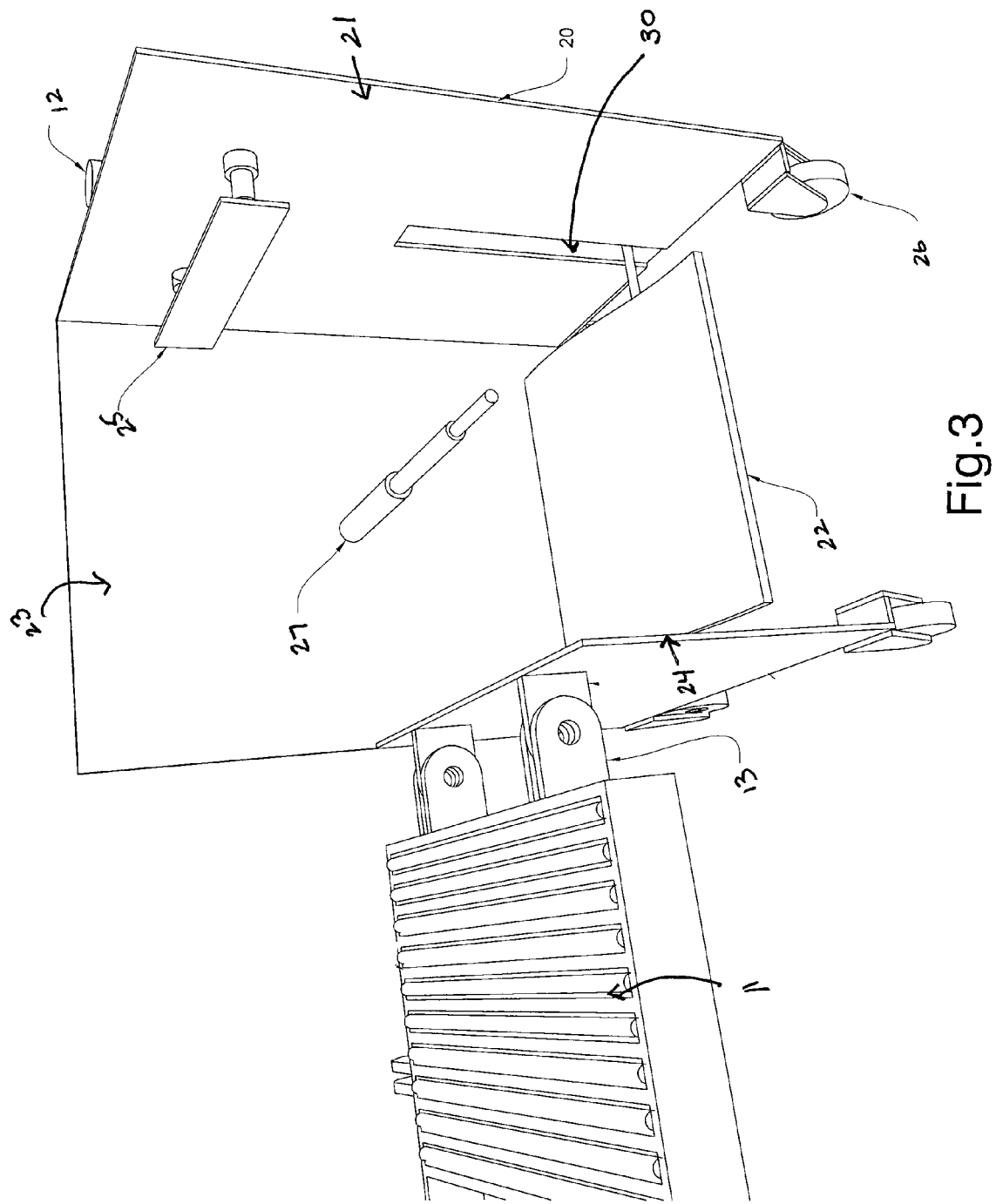
FIG. 3 is a front on view of a barrel catcher.
Figure 4:
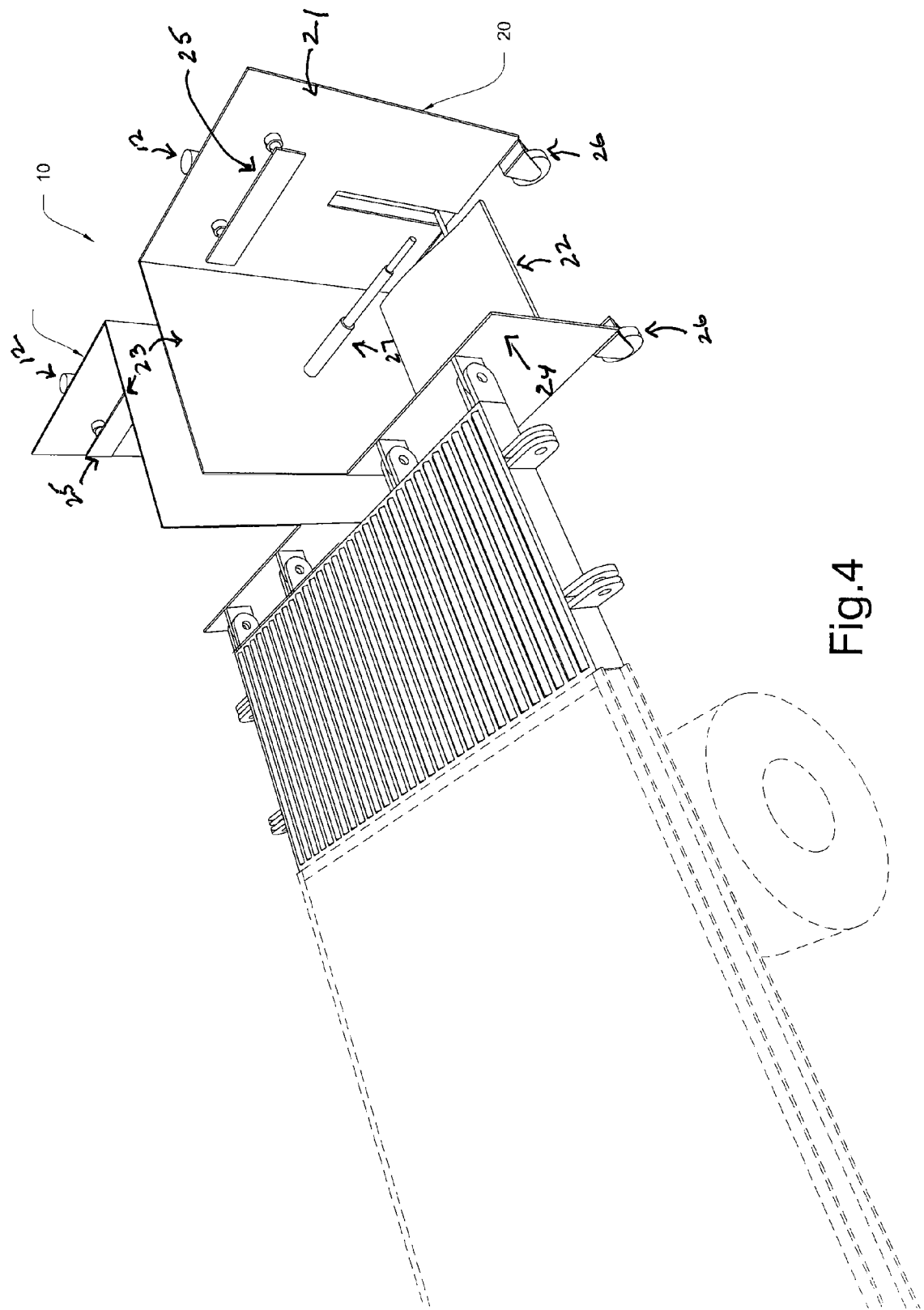
FIG. 4 is front elevational view of the invention attached to a truck.

The present invention is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art. The following description generally refers to FIG. 1 through FIG. 5 and like parts are numbered similarly.

This invention is concerned with the placement and removal of barrels at construction sites, highways, and other places where barrels may be used. The current invention may be utilized on any commercially available powered and wheeled chassis of a suitable type that has the basic construction features allowing the invention to be mounted on it. In the preferred embodiment, the invention is mounted on a flat bed truck.

The invention, an apparatus to place and remove barrels from a road comprising a conveyer system (10) and at least one barrel catcher (20). The conveyer system (10) is comprised of a conveyor belt, rollers, or a combination thereof (hereinafter referred to, individually and collectively, as "roller deck") (11). In the preferred embodiment, the roller deck (11) runs the width of the truck bed, as shown by the arrow in FIG. 1.

The apparatus further comprises a hydraulic system. In the preferred embodiment, the hydraulic system sits below the roller deck (11). A portion of the system is shown as (12). The hydraulic system (12) is used to operate the roller deck (11) and the at least one barrel catcher (20).

The roller deck (11) is attached to a truck bed. Normally, a truck bed has two ends; at the first end the truck bed end is attached to a truck cab and at the second end the truck bed is generally open. In one embodiment, the roller deck (11) is removably attached by a hinge system to the second end of the truck bed. In another embodiment, the roller deck (11) is attached to the second end of the truck bed so that the roller deck (11) can be moved towards or away from the truck by at least one hydraulic cylinder that runs of a power take off ("PTO") which works off the truck's transmission.

In the preferred embodiment, the at least one barrel catcher (20) is attached to the roller deck (11) using at least one hinge system (13). The at least one hinge (13) allows the at least one barrel catcher (20) be folded onto the roller deck (11) when not in use. In another embodiment, the at least one barrel catcher (20) can be removed from the roller deck (11) when not in use.

The barrel catcher (20) comprises at least a back side (21), a left side (23), and a front side (24); where the left side (23) is attached to both the back side (21) and the front side (24) generally forming a "U" shape. The back side (21) defines a slit (30). The barrel catcher (20) also comprises a paddle (22). The paddle (22) is attached to the left side (23) and to a hydraulic cylinder through the slit (30). The barrel paddle (22) is sloped, as shown in drawings, so that it a barrel can be lifted from its underside. The hydraulic cylinder moves the paddle (22) downward allowing the a barrel to be place onto the road or upward allowing a barrel to be picked up off the road.

The barrel catcher (20) further comprises a bar (25) and a telescoping rod (27). The bar (25) and rod (27) is moved to and fro utilizing the system's hydraulic system. When a barrel is dropped into the barrel catcher (20) the rod (27) pushes the barrel out onto the road off the paddle (22). When the barrel catcher (20) is removing barrels from the road, the barrel catcher (20) scoops the barrel and lifts it toward the truck then the bar (25) pushes the barrel back onto the truck.

It should be noted here that when multiple barrel catchers (20) are being used on one truck, the barrel catchers can operate to unload barrels only, up-load barrels only, or in some combinations thereof.

In a preferred embodiment, the back side (21) comprises at least two wheels (26). In another preferred the back side (21) comprises at least two wheels (26) and the front side (24) comprises at least 2 wheels (26).

I claim as my invention as:

1. An apparatus used to set and remove safety barrels, where the safety barrel is fillable in order to add weight for stability, from a road or other work site comprising:
   a roller deck; where the roller deck is operably attached to a truck bed; where the truck bed has a front axle and a rear axle; where the roller deck is operably attached such that the longitudinal axis of the roller deck is parallel to the rear axle axis;
   at least one safety barrel catcher where the barrel catcher is movably attached to the roller deck;
   where the safety barrel catcher comprises a back side, left side, front side, and a paddle;
   where the left side is attached to both the front side and the backside to generally form a "U" shape; where the back side defines a slot; where the paddle is movably attached to the barrel catcher through the slot to a hydraulic cylinder; and
   where the left side comprises at least one telescoping bar or rod; where the bar or rod telescopes out from the left side.

2. The apparatus of claim 1 is powered by a power take off ("PTO") by a truck's transmission system.

3. The apparatus of claim 2 where the roller deck comprises a conveyor belt, rollers, or a combination thereof.

4. The apparatus of claim 3 where the at least one safety barrel catcher is operably attached to the roller deck with a hinge system.

5. The apparatus of claim 4 where the safety barrel catcher comprises at least one wheel.

* * * * *